United States Patent [19]

Kellerman

[11] Patent Number: 4,771,363

[45] Date of Patent: Sep. 13, 1988

[54] HERMETIC SEALING FOR FILM CAPACITOR

[76] Inventor: Hillel J. Kellerman, 9323 Duxbury Rd., Los Angeles, Calif. 90034

[21] Appl. No.: 59,336

[22] Filed: Jun. 8, 1987

[51] Int. Cl.[4] .......................... H01G 1/14; H01G 7/00
[52] U.S. Cl. ..................................... 361/306; 29/25.42
[58] Field of Search ............... 361/306, 307, 308, 309, 361/310, 433 C; 29/25.42

[56] References Cited

U.S. PATENT DOCUMENTS

| 2,047,273 | 7/1936 | Kopinski | 361/310 X |
| 3,129,490 | 4/1964 | Rollefson | 361/310 X |
| 4,589,058 | 5/1986 | Peternell et al. | 361/433 C |
| 4,604,676 | 8/1986 | Senda et al. | 361/309 |

FOREIGN PATENT DOCUMENTS

| 2747552 | 5/1979 | Fed. Rep. of Germany | 361/310 |
| 512102 | 8/1939 | United Kingdom | 361/306 |

Primary Examiner—Donald A. Griffin
Attorney, Agent, or Firm—Christie, Parker & Hale

[57] ABSTRACT

A hermetically sealed capacitor comprises a generally cylindrical ceramic tube having opposite annular tube ends that are generally parallel to each other; a generally cylindrical capacitor element within the tube; and a pair of metal end caps, each including a receptacle defined by a generally circular end wall portion, an integral tube wall portion, and an integral terminal. The inner diameter of the tube wall portion is slightly larger than the outer diameter of the ceramic tube portion so as to provide, during assembly of the capacitor, an aligning guide for disposing the ceramic tube end within the receptacle. A pair of parallel disk-shaped soldered bonds are provided; each bonding one of the end caps to one of the tube ends so that the ceramic case, the end caps, and the bonds provide a hermetically sealed case for the capacitor element.

16 Claims, 2 Drawing Sheets

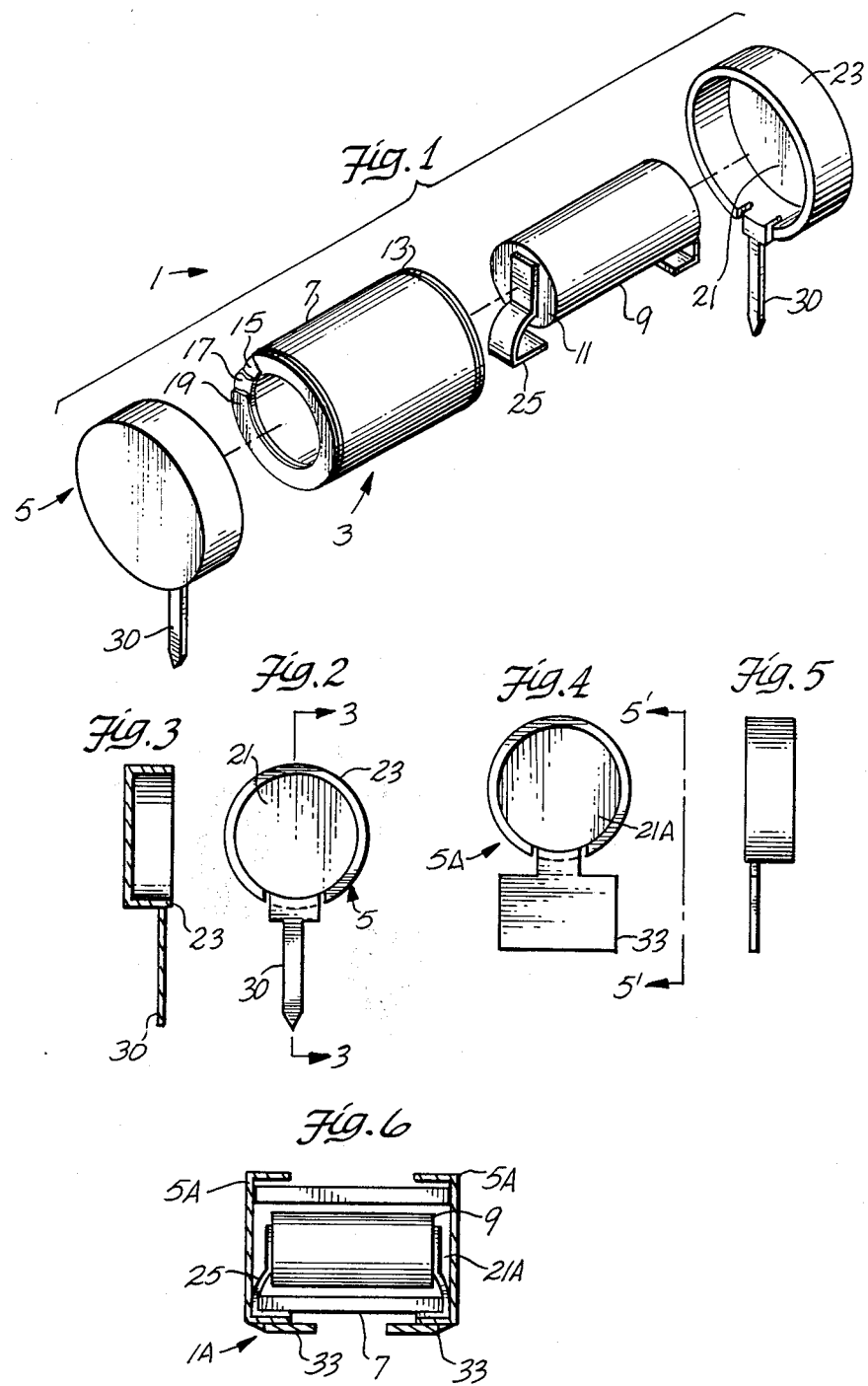

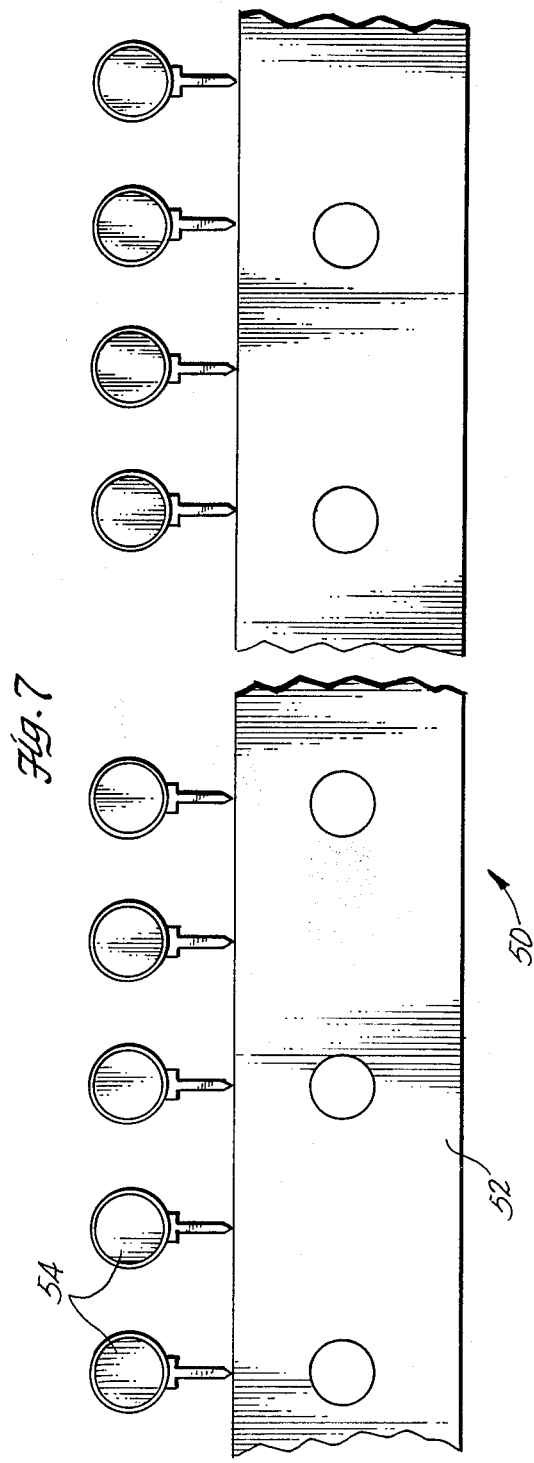

HERMETIC SEALING FOR FILM CAPACITOR

BACKGROUND OF THE INVENTION

In general, this invention relates to capacitors; more particularly, it relates to a hermetically sealed film capacitor and a method for mass producing a hermetically sealed film capacitor.

Hermetically sealed film capacitors have widespread uses, particularly in electronic equipment that must meet stringent reliability requirements for operating in adverse environments. Because hermetically sealed capacitors have such widespread uses in electronic equipment, and often many such capacitors are needed in circuits within such electronic equipment, such capacitors are made on a high-volume basis. It is accordingly desirable to provide a method of mass producing hermetically sealed film capacitors with low material and manufacturing costs, consistent with the need for high reliability of the capacitors.

Various types of materials have been used to form a hermetically sealed case for a film capacitor. Very commonly, some type of metal has been used to make essentially all of the case, with various insulating materials such as glass being combined with the otherwise all-metal case so that electrically conductive terminal leads for the capacitor are insulated from the metal of the case.

Other materials that have been proposed for use in a sealing case are electrically insulating. U.S. Pat. No. 4,614,995 to Lavene is directed to a planar terminated surface mount capacitor having an electrically insulating casing element to which box-shaped metal end caps are bonded. Lavene teaches, in general way, using some type of ceramic as the material for the casing element. The material and manufacturing costs involved in making a capacitor such as Lavene proposes include the cost of providing an expensive noble metal (silver or gold), which is deposited to provide two ceramic-bonded metallization layers shaped in the form of outer-periphery bands surrounding the ceramic casing element. Less expensive hot tin is deposited over the noble metal bands. As to the labor or other manufacturing costs, these include costs attributable to the need to fit each end cap precisely so that all of four inwardly-facing surfaces of the end cap abut the outer-periphery band during a soldering operation to secure and seal the box-shaped end cap to the ceramic casing element.

A need exists for a low cost, reliable, hermetically sealed capacitor.

SUMMARY OF THE INVENTION

This invention provides a new and advantageous combination of elements for a relatively low-cost, reliable, hermetically sealed film capacitor, and a new and advantageous combination of steps for manufacturing such a capacitor. The invention can be defined in various terms. In terms of a product, the invention resides in a hermetically sealed capacitor comprising a generally cylindrical ceramic tube having opposite annular tube ends that are generally parallel to each other. A generally cylindrical capacitor element is within the tube. A pair of metal end caps are provided. Each end cap includes a receptacle defined by a generally circular end wall portion and an integral tube wall portion. The inner diameter of the tube wall portion is slightly larger than the outer diameter of the ceramic tube portion so as to provide, during assembly of the capacitor, an aligning guide for disposing the ceramic tube end within the receptacle. Each end cap further includes an integrally formed mounting terminal. In one embodiment, this mounting terminal is a prong adapted to fit into a hole in a printed circuit board. In another embodiment, this mounting terminal is a folded element defining a planar surface for surface mounting of the capacitor. Electrically conductive means provide electric current flow paths from each opposite end of the capacitor element through a respective end cap. A pair of parallel disk-shaped soldered bonds are provided; each bonding one of the end caps to one of the tube ends so that the ceramic case, the end caps, and the bonds provide a hermetically sealed case for the capacitor element.

According to a preferred feature, each disk-shaped soldering bond comprises a base metallization layer bonded to the ceramic tube end, and a soldering layer bonding the base metallization layer to the respective end cap. One advantage of the invention is that the base metallization layer need not be made of a noble metal, and in the preferred embodiment is made of a molybdenum-manganese alloy. The material costs for a capacitor in accord with the preferred embodiment are relatively low for numerous reasons, one of which is that ceramic tubes having end faces metallized are commercially available at relatively low cost because they are manufactured in substantial quantities for incorporation into various end-use items.

In method terms, the invention resides in a manufacturing method for surrounding a generally cylindrical capacitor element with a hermetically sealed case. The method comprises inserting the capacitor element within a ceramic tube to make a sub-assembly, the ceramic tube having generally parallel, solder-covered, opposite end faces. Another step is to form a plurality of metal end caps such that each end cap provides a generally cylindrical receptacle defined by an end wall portion and an integral tube wall portion, and provides an integrally formed mounting terminal. The sub-assembly is combined with a pair of such end caps to make a hermetically sealed capacitor. The combining step includes aligning the sub-assembly with a respective receptacle and moving them relative to each other to bring a solder-covered end face into contact with an end wall portion, and applying heat to form an annular disk-shaped solder joint bonding the contacting end face and end wall portion together.

In the presently preferred practice of the method, the step of forming the metal end caps includes simultaneously forming a plurality of end caps with a temporary common support holding the simultaneously formed end caps in a row. The method further comprises removing the temporary support.

The foregoing and other distinguishing and advantageous features of the invention are described in detail below, and are recited in the appended claims.

BRIEF DESCRIPTION OF THE DRAWINGS

FIG. 1 is an exploded perspective view of a hermetically sealed capacitor according to one embodiment of this invention, in which each of opposite metal end caps has an integrally formed terminal pin in the form of a prong adapted to fit into a hole in a printed circuit board, and in which a pair of disk-shaped metallization layers on opposite ends of a ceramic tube are shown on an enlarged scale for clarity;

FIG. 2 is an elevation view of a metal end cap included in the embodiment of FIG. 1;

FIG. 3 is a cross-sectional view of the cap of FIG. 2, taken along the line 3—3' of FIG. 2;

FIG. 4 is an elevation view of a metal end cap included in an embodiment to provide for surface mounting;

FIG. 5 is an elevation view of the cap of FIG. 4, as seen from 5—5';

FIG. 6 is a longitudinal cross sectional view of an embodiment in which each of a pair of the metal end caps of FIG. 4 has had an integrally formed terminal pin folded to define a planar surface for surface mounting and in which certain features are shown on an enlarged scale for clarity; and FIG. 7 shows a temporary sub-assembly of a multiplicity of end caps with a common support member holding the end caps in a row to facilitate mass production assembly of capacitors in accord with a method provided by this invention.

DETAILED DESCRIPTION

FIG. 1 shows an exploded perspective view of a hermetically sealed capacitor 1 according to one embodiment of the invention. Capacitor 1 comprises a tube-and-capacitor sub-assembly 3 and a pair of metal end caps 5. Sub-assembly 3 includes a generally cylindrical ceramic tube 7, and a generally cylindrical capacitor element 9 that fits within tube 7. Capacitor element 9 is a conventional rolled film capacitor having a metallization layer 11 on each of its opposite generally circular end surfaces. Any of numerous types of such rolled film capacitors can be incorporated, including metallized polycarbonate capicators, metallized polypropylene capacitors, and the like. The diameters and lengths of such conventional metallized rolled film capacitors are selected in accord with well known principles to meet specifications for a desired capacitance value that can be anywhere within a broad range such as from a relatively small value of 0.001 microfarad to a relatively large value of 27 microfarad. For a relatively small capacitor 1, the outer diameter of end cap 5 is approximately 0.1 inches; for a relatively large capacitor 1, this diameter is approximately 0.5 inches. Preferably, end caps incorporated into capacitors embodying this invention are stamped from brass alloy sheets that are approximately 0.007 inches thick. Preferably, such sheets are tin plated before being subjected to the stamping operation to form the end caps.

Ceramic tube 7 has opposite annular, very thin disk-shaped ends 13 that are generally parallel to each other.

Preferably, the ceramic material of tube 7 between disk-shaped ends 13 is aluminum oxide ($Al_2O_3$). Each disk-shaped end 13 comprises multiple layers. Portions of the layers are broken away in FIG. 1 to show a ceramic tube end surface 15 and a base metallization layer 17 that is bonded to the surface 15. An outer soldering layer 19 is bonded to base metallization layer 17. Preferably, the base metallization layer is made of a molybdenum-manganese alloy. Preferably, the soldering layer comprises a high-temperature tin/lead solder comprising approximately 95% tin and approximately 5% lead. This contrasts with medium temperature solder comprising approximately 63% tin and approximately 37% lead. The thickness of the base metallization layer is preferably in the range of approximately 0.0004 inches (0.4 mils) to approximately 0.0015 inches (1.5 mils). The thickness of the soldering layer is preferably in the range of approximately 40 microinches to approximately 150 microinches.

The material costs for a capacitor in accord with the preferred embodiment are relatively low for numerous reasons. Firstly, the base metallization layer need not be made of a noble metal, but rather as stated above is preferably made of a molybdenum-manganese alloy. Secondly, ceramic tubes having end faces metallized with layers of molybdenummanganese and high temperature tin-lead solder are commercially available at relatively low cost because they are manufactured and sold by various porcelain companies, both domestic and foreign, in substantial quantities for incorporation into various end-use items.

Each end cap 5 includes a receptacle defined by a generally circular end wall portion 21 and an integral tube wall portion 23. The inner diameter of tube wall portion 21 is slightly larger than the outer diameter of ceramic tube 7 so as to provide, during assembly of the capacitor, an aligning guide for disposing the ceramic tube end within the receptacle with the surface of soldering layer 19 engaged with the inwardly facing surface of end wall portion 21. Suitably, the length of tube wall portion is approximately 0.045 inches.

Electrically conductive means are provided to define electric current flow paths from each opposite end of the capacitor element through a respective end cap. More particularly, a pair of conductive foil tabs 25 are provided. Each foil tab 25 has one of its ends electrically connected to the generally circular metallized end 11 of capacitor element 9; its opposite end is electrically connected to the metal end cap 5 in a completely assembled capacitor according to this invention. Suitably, each foil tab 25 is made of copper and is approximately 0.003 inches thick.

FIG. 2 is an elevation view of metal end cap 5, and FIG. 3 is a cross-sectional view taken along the line 3—3' of FIG. 2. FIGS. 4 and 5 are front and side elevation views of a metal end cap 5A included in an embodiment, illustrated in FIG. 6, to provide for surface mounting. End cap 5 has an integrally formed depending terminal pin in the form of a prong 30 adapted to fit into a hole in a printed circuit board. End cap 5A has an integrally formed depending terminal pin in the form of a fold-up mounting terminal 33. As a result of the stamping operation by which an end cap is formed (whether end cap 5 or end cap 5A), there are formed a pair of parallel slits that extend part way into the tube wall portion toward the end wall portion.

As shown in FIG. 6, a capacitor 1A according to an alternative embodiment of the invention incorporates two end caps 5A with each fold-up mounting terminal 33 having been folded to define a planar surface for surface mounting of the capacitor. In FIG. 6, certain features are shown on an enlarged scale for clarity. These features include the thickness of each tab 25, and the clearances including the clearance between the outside diameter of capacitor element 9 and the inside diameter of ceramic tube 7, and the clearances between the circular ends of capacitor element 9 and the surfaces 21A of end cap 5A.

This invention provides a mass production method for manufacturing hermetically sealed capacitors, each containing a generally cylindrical capacitor element. The steps of the method include making a multiplicity of like sub-assemblies 3, each of which is assembled by inserting a capacitor element 9 within a ceramic tube 7 having parallel, solder-covered, opposite end faces. Foil tabs 25 are soldered to the circular metallized end surfaces of each capacitor 9.

The steps also include forming a plurality of temporary sub-assemblies such as the temporary sub-assembly generally indicated at 50 in FIG. 7, each comprising a multiplicity of end caps (whether like end cap 5 or end cap 5A or an equivalent end cap) with a temporary common support 52 holding the end caps in a row so that the receptacle 54 of each end cap in the row faces in the same direction. The method further comprises steps to combine each of the like sub-assemblies with a pair of end caps to make a hermetically sealed capacitor. This combining step includes aligning eac of a multiplicity of like sub-assemblies with a respective receptacle and moving them relative to each other to bring a solder-covered end face into contact with an end wall portion. Preferably, each temporary sub-assembly is held in a fixture, and the tube-and-capacitor sub-assemblies 3 are translated toward the receptacles so that each is guided into place by the tubular wall portion of the end cap. As each sub-assembly 3 moves into place, the free portion of foil tab 25 becomes trapped between the outer cylindrically shaped peripheral end of the ceramic tube an the inwardly facing surfaces of the end cap. Next, heat is applied to each end cap to form an annular disk-shaped solder joint to bond together the contacting end face and end wall portion. After this step is completed, each temporary common support is removed.

I claim:

1. A hermetically sealed capacitor comprising:
   a generally cylindrical ceramic tube having opposite annular tube ends that are generally parallel to each other;
   a generally cylindrical capacitor element within the tube, the capacitor element having opposite generally circular end surfaces and having a metallization layer on each of its end surfaces;
   a pair of metal end caps, each end cap including a receptacle defined by a generally circular end wall portion and an integral tube wall portion, and including an integrally formed mounting terminal, the inner diameter of the tube wall portion being slightly larger than the outer diameter of the ceramic tube portion so as to provide, during assembly of the capacitor, an aligning guide for disposing the ceramic tube end within the receptacle;
   electrically conductive means providing an electric current flow paths from the metallization layer on each opposite end of the capacitor element through a respective end cap; and
   a pair of parallel disk-shaped soldered bonds, each bonding one of the end caps to one of the tube ends so that the ceramic tube, the end caps, and the disk-shaped soldered bonds provide a hermetically sealed case for the capacitor element.

2. A capacitor according to claim 2, wherein each diskshaped soldering bond comprises a base metallization layer bonded to the ceramic tube end, and a soldering layer bonding the base metallization layer to the respective end cap.

3. A capacitor according to claim 2, wherein the electrically conductive means comprises a pair of conductive foil tabs electrically connected between the generally circular metallization layers and the end caps.

4. A capacitor according to claim 1, wherein each disk-shaped bonding disk comprises a molybdenum-manganese base metallization layer bonded to the ceramic tube end, and a soldering layer bonding the base metallization layer to the respective end cap.

5. A capacitor according to claim 4, wherein the soldering layer comprises a high-temperature tin/lead solder.

6. A capacitor according to claim 1, wherein each integrally formed mounting terminal is a prong adapted to fit into a hole in a printed circuit board.

7. A capacitor according to claim 6, wherein each integrally formed mounting terminal comprises a folded element defining a planar surface for surface mounting of the capacitor.

8. A manufacturing method for surrounding a generally cylindrical capacitor element with a hermetically sealed case, the method comprising:
   (a) inserting the capacitor element within a ceramic tube to make a sub-assembly, the ceramic tube having generally parallel, solder-covered, opposite end faces;
   (b) forming a plurality of metal end caps such that each end cap provides a generally cylindrical receptacle defined by an end wall portion and an integral tube wall portion, and provides an integrally formed mounting terminal;
   (c) aligning the sub-assembly and the receptacle of one of the end caps, and moving them relative to each other to bring a solder-covered end face into contact with an end wall portion;
   (d) applying heat to form an annular disk-shaped solder joint bonding the contacting end face and end wall portion together; and
   (e) repeating steps c and d, so that the ceramic tube, the end caps, and the disk-shaped solder joints provide a hermetically sealed case for the capacitor element.

9. A method according to claim 8, wherein the end caps are formed by stamping.

10. A method according to claim 8, and further comprising the step of folding the mounting terminal to provide a bottom planar surface for use in surface mounting the capacitor.

11. A method according to claim 10, wherein the step of forming the metal end caps includes simultaneously forming a plurality of end caps with a temporary common support holding the simultaneously formed end caps in a row, and wherein the method further comprises removing the temporary support.

12. A mass production method for manufacturing hermetically sealed capacitors, each containing a generally cylindrical capacitor element, the method comprising:
   assembling a multiplicity of like sub-assemblies, each of which is assembled by inserting a capacitor element within a ceramic tube having parallel, solder-covered, opposite end faces;
   forming a plurality of temporary sub-assemblies, each comprising a multiplicity of end caps with a temporary common support holding the end caps in a row, each end cap being formed to provide a generally cylindrical receptacle defined by an end wall portion and an integral tube wall portion;
   combining each of the like sub-assemblies with a pair of end caps to make a hermetically sealed capacitor, the combining step including aligning each of a multiplicity of like sub-assemblies with a respective receptacle and moving them relative to each other to bring a solder-covered end face into contact with an end wall portion, and applying heat to form an annular disk-shaped solder joint bonding the contacting end face and end wall portion together, so that the ceramic tube, the end caps, and the disk-shaped solder joints provide a hermetically sealed case for the capacitor element; and removing each temporary common support.

13. A method according to claim 12, wherein each temporary assembly is formed by stamping.

14. A method according to claim 12, wherein each end cap includes an integrally formed mounting terminal, and further comprising the step of folding the mounting terminal to provide a bottom planar surface for use in surface mounting the capacitor.

15. A method according to claim 12, wherein each ceramic tube has a ceramic-bonded metallization layer supporting a tin/lead solder layer that defines a respective solder-covered end face.

16. A method according to claim 12, wherein each like sub-assembly further comprises a generally circular metallization layer on the capacitor element, and a conductive foil tab electrically connected to the generally circular metallization layer, and wherein the foil tab is soldered to the end cap as the end cap is solder-bonded to the ceramic tube end.

* * * * *

UNITED STATES PATENT AND TRADEMARK OFFICE
CERTIFICATE OF CORRECTION

PATENT NO. : 4,771,363
DATED : September 13, 1988
INVENTOR(S) : Hillel J. Kellerman It is certified that error appears in the above-identified patent and that said Letters Patent is hereby corrected as shown below:

In the Specification

Column 3, line 34, change "capicators" to -- capacitors --.
Column 3, lines 43, 44, 47, 66, and 67, change "inches" to -- inch -- (all occurrences).

Column 4, line 9, change "molybdenummanganese" to -- molybdenum manganese --.
Column 4, lines 24 and 35, change "inches" to -- inch -- (both occurrences).

Column 5, line 13, after "aligning" change "eac" to -- each --.
Column 5, line 24, after "tube" change "an" to -- and --.
Column 5, line 57, before "wherein" change "claim 2" to -- claim 1 --.
Column 5, line 58, change "diskshaped" to -- disk shaped --.

Signed and Sealed this

Twenty-first Day of March, 1989

Attest:

DONALD J. QUIGG

*Attesting Officer*      *Commissioner of Patents and Trademarks*